US006975460B2

(12) United States Patent
Ikeda et al.

(10) Patent No.: US 6,975,460 B2
(45) Date of Patent: Dec. 13, 2005

(54) PROJECTION LENS APPARATUS AND PROJECTION TYPE IMAGE DISPLAY APPARATUS

(75) Inventors: Hidehiro Ikeda, Yokohama (JP); Masahiko Yatsu, Fujisawa (JP); Koji Hirata, Yokohama (JP); Junichi Ikoma, Yokosuka (JP)

(73) Assignee: Hitachi, Ltd., Tokyo (JP)

( * ) Notice: Subject to any disclaimer, the term of this patent is extended or adjusted under 35 U.S.C. 154(b) by 171 days.

(21) Appl. No.: 10/420,771

(22) Filed: Apr. 23, 2003

(65) Prior Publication Data

US 2003/0197954 A1 Oct. 23, 2003

Related U.S. Application Data

(63) Continuation of application No. 09/903,510, filed on Jul. 13, 2001, now Pat. No. 6,560,041.

(30) Foreign Application Priority Data

Jul. 14, 2000 (JP) ........................................ 2000-218706

(51) Int. Cl.[7] ............................ G02B 3/00; G03B 21/28
(52) U.S. Cl. ........................ 359/649; 359/651; 353/69; 353/77
(58) Field of Search ..................... 353/69, 77; 359/749, 359/649, 651, 753

(56) References Cited

U.S. PATENT DOCUMENTS

| 5,096,288 A | * | 3/1992 | Yano et al. .................. 353/69 |
| 5,223,869 A | * | 6/1993 | Yanagi ......................... 353/78 |
| 5,371,559 A | * | 12/1994 | San-Nohe et al. ............ 353/31 |
| 5,666,228 A | | 9/1997 | Yamamoto |
| 5,870,228 A | | 2/1999 | Kreitzer et al. |
| 5,946,144 A | | 8/1999 | Yamamoto |
| 5,947,576 A | | 9/1999 | Sato |
| 6,008,952 A | | 12/1999 | Yamamoto |
| 6,160,671 A | | 12/2000 | Nakazawa |
| 6,181,483 B1 | | 1/2001 | Takatsuki |

FOREIGN PATENT DOCUMENTS

| JP | 62-206513 | 9/1987 |
| JP | 08-102899 | 4/1996 |
| JP | 9-96759 | 4/1997 |
| JP | 10-142503 | 5/1998 |
| JP | 10-186509 | 7/1998 |
| JP | 11-149041 | 2/1999 |
| JP | 11-101940 | 4/1999 |
| JP | 11-194266 | 7/1999 |
| JP | 11-231219 | 8/1999 |
| JP | 11-326755 | 11/1999 |
| JP | 2000-39553 | 2/2000 |
| WO | WO99/08138 | 2/1999 |

* cited by examiner

*Primary Examiner*—Scott J. Sugarman
(74) *Attorney, Agent, or Firm*—Antonelli, Terry, Stout and Kraus, LLP.

(57) ABSTRACT

A projection type image display apparatus having an image display element outputting an image ray, a projection lens apparatus for performing overhead projection of the image ray from the image display element, the projection lens apparatus having a plurality of lens elements, a reflection mirror reflecting the image ray from the projection lens apparatus, and a screen on which the image ray reflected by the reflection mirror is projected. An optical axis of the projection lens apparatus is decentered from a center of the screen.

10 Claims, 11 Drawing Sheets

ASTIGMATISM

DISTORTION ABERRATION

SPHERICAL ABERRATION

ASTIGMATISM

DISTORTION ABERRATION

ASTIGMATISM

DISTORTION ABERRATION

SPHERICAL ABERRATION

ASTIGMATISM

DISTORTION ABERRATION

PROJECTION LENS APPARATUS AND PROJECTION TYPE IMAGE DISPLAY APPARATUS

CROSS REFERENCE TO RELATED APPLICATION

This is a continuation of U.S. application Ser. No. 09/903,510, filed Jul. 13, 2001, now U.S. Pat. No. 6,560,041 the subject matter of which is incorporated by reference herein.

BACKGROUND OF THE INVENTION

1. Field of the Invention

The present invention relates to a projection lens apparatus for allowing a source light to be made incident in an image display apparatus so that an overhead projection of the reflected light or the transmitted light is performed on a projection screen, and also relates to a projection type image display apparatus equipped with the projection lens apparatus.

2. Description of the Prior Art

The main stream of a projection type image display apparatus has been a type that performs an overhead projection of an image formed in a CRT. In order to improve the efficiency of light usage, and reduce the size and the weight of the apparatus, a projection type image display equipped with a liquid crystal display element and a micro mirror display element (hereinafter, referred to as a DMD element) instead of a CRT has been recently developed. This projection type image display apparatus is configured such that a source light is modulated by transmitting or reflecting it at each pixel in accordance with video signals applied to the above display element, thereby allowing a projection lens apparatus to perform a overhead projection and thus form an image.

Although the image display apparatus equipped with a CRT is capable of electrically compensating distortion aberration of a projection image, the image display apparatus equipped with a liquid crystal display element or a DMD element is not. For that reason, the latter apparatus is required to optically compensate the distortion aberration.

A projection type lens apparatus using liquid display elements also has been developed as set forth, e.g., in JP-A-11-149041 specification, however, it has a drawback of a short back focus of about 20 mm.

SUMMARY OF THE INVENTION

In view of the above problems, it is an object of the present invention to provide a projection lens apparatus for forming an image with high resolution by satisfactorily compensating various kinds of aberration, while securing an appropriate back focus so that another optical component is arranged between the projection lens apparatus and an image display element such as a liquid crystal display element and a DMD element.

In order to attain the above described object, a projection lens apparatus according to the present invention is designed to satisfy the following conditions (1) to (4), in which a first lens group having a negative refracting power, a second lens group having a positive refracting power, and a third lens group having a positive refracting power are arranged from a projection screen side (a light emission side) to an image display element side (a light incidence side) in this order.

$$1.4 < |f_1|/f \quad (1)$$

$$2.8 < f_3/f \quad (2)$$

$$3.6 < f_b/f \quad (3)$$

$$0.1 < |f_1/f_{23}| < 0.3 \quad (4)$$

here, $f$, $f_1$, and $f_3$ represent focal lengths of a whole lens system, a first lens group, and a third lens group, respectively, and $f_{23}$ represents a combined focal length of a second and third lens groups, and further $f_b$ represents a back focus of the whole lens system.

Power distribution of the first to third lens groups as defined above allows the projection lens apparatus to compensate satisfactorily various kinds of aberration, while the compactness and the wide-angle of the apparatus are achieved.

The conditions (1) and (2) are set to reduce chromatic aberration of magnification by controlling powers of the first and third lens groups which are to have a maximum off-axis ray height. It becomes difficult to compensate the chromatic aberration of magnification, when $|f_1|/f$ and $f_3/f$ become equal to or fall below the respectively corresponding lower limits.

The condition (3) is set to secure an appropriate back focus. When $f_b/f$ becomes equal to or falls below its lower limit, the back focus becomes smaller, accordingly making it difficult to arrange an optical component between the lens apparatus and the liquid crystal image display such as the liquid crystal display element and the DMD element.

The condition (4) is set to secure an appropriate back focus and to reduce distortion aberration. When $|f_1/f_{23}|$ becomes equal to or exceeds its upper limit, positive powers of the second and third lens groups increase, accordingly making it difficult to secure an appropriate back focus. On the other hand, a negative power of the first lens group increases, thereby causing negative distortion aberration to increase, when $|f_1/f_{23}|$ becomes equal to or falls below its lower limit.

The projection lens apparatus according to the present invention also may allow the first, second and third lens groups to have a spherical surfaces. If every lens group has an aspherical surface thereat, the first and third lens groups compensate aberration such as distortion aberration and chromatic aberration of magnification on the aspherical surfaces thereof, and the second lens group compensates aberration of an on-axis ray on its aspherical surface. This configuration permits the lens apparatus to have more versatility of possible compensation of aberration, accordingly to perform further compensation of aberration.

In particular, using an aspherical surface as an emission surface of a third lens of the third lens group, having a large off-axis ray height, serves to effectively compensate aberration of an off-axis ray. Using an aspherical surface also as an incidence surface of a second lens of the second lens group serves to most effectively compensate aberration of an on-axis ray.

Using a plastic lens as a first lens of the first lens group, having a largest diameter among lenses of the projection lens apparatus according to the present invention, allows the apparatus according to the present invention to reduce its weight. However, since the plastic lens changes in shape according to changes in temperature and humidity, the lens characteristics thereof such as lens focus and MTF deteriorates, when the plastic lens has a large power. The condition below is intended to control the power of the plastic lens so that the lens characteristics do not deteriorate even when the plastic lens changes in shape according to changes in temperature and humidity.

$$7 < |f_{L1}/f| \quad (5)$$

A typical plastic lens has poor accuracy in shape and large deviations in shape accuracy compared to a glass lens. To suppress the deterioration of the plastic lens having deviations in shape accuracy, a ray is made incident on the plastic lens, in a direction substantially perpendicular to the plastic lens, serving as the first lens of the first lens group in the projection lens apparatus according to the present invention. This configuration allows the plastic lens to have a larger tolerance in shape and enhance its manufacturability.

Achieving the compactness and the wide-angle of the projection lens apparatus is required to reduce the size of the project type image display apparatus. Decentering the optical axis of the lens apparatus against the center of the projection screen allows the projection type image display apparatus to be downsized further. Decentering the projection lens apparatus against the center of the projection screen requires decentering a Fresnel screen against the projection screen.

When the optical axis of the projection lens apparatus is decentered against the center of the projection screen, ratios of peripheral light quantities at the upper and lower parts of the screen are generally different because of different distances from the optical axis of the projection lens apparatus to the upper and lower parts of the screen. In the projection type image display apparatus according to the present invention, difference in ratios of peripheral light quantities at the upper and lower parts of the screen is designed to be 10% or less so that brightness at the upper and lower parts of the screen is substantially equal.

DESCRIPTION OF THE PREFERRED EMBODIMENTS

Referring now to the attached drawings, preferred embodiments of the present invention will be described. FIGS. 1, 5, 9, 13, and 17 are illustrations of projection lens apparatuses according to the embodiments of the present invention. The following description will be focused mainly on FIG. 1, and descriptions on FIGS. 5, 9, 13, and 17 will be omitted since these figures are considered to be understood from data in Tables 2 to 5 and on the analogy of the description on FIG. 1.

Figure 1:
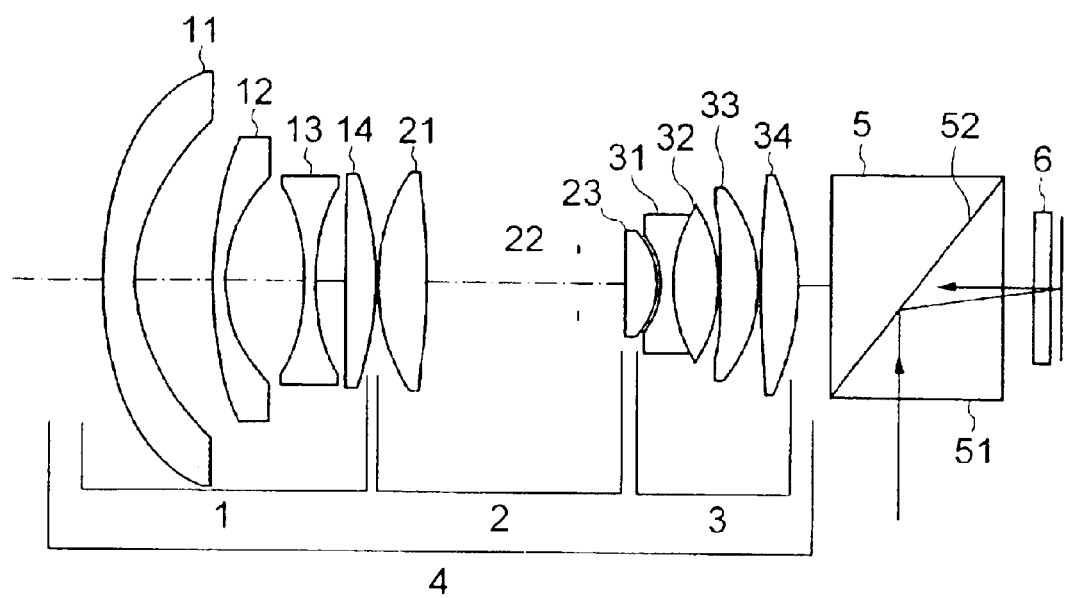
FIG. 1 is a schematic view of a projection lens apparatus according to a first embodiment of the present invention.

FIG. 1 is a schematic view of a first embodiment of the projection lens apparatus and its associated optical components showing, from a projection screen (not shown) or the left side of the plane of the figure, a first lens group 1, a second lens group 2, a third lens group 3, a total reflection prism (hereinafter, referred to as a TIR prism) 5, and a DMD element 6 in this order. The above three lens groups 1 to 3 constitute a projection lens apparatus 4. A ray emitted from a light source is made incident on an incidence plane 51 of the TIR prism 5, and is totally reflected at a total reflection plane 52 of the TIR prism 5, and then is made incident on the DMD element 6. After reflected on an active plane of the DMD element 6, the incident ray transmits the TIR prism 5, and is made incident on the projection lens apparatus 4, and then is projected on the screen.

The projection lens apparatus 4 is provided with the first lens group 1 having a negative refracting power, the second lens groups 2 having a positive refracting power, and third lens groups 3 having a positive refracting power. The first lens group 1 includes a first lens 11 as well as a second lens 12 of negative meniscus lenses facing their convex surfaces toward the screen, and a third lens 13 of a biconcave lens, in addition to a fourth lens 14 of a biconvex lens. The second lens group 2 includes a fifth lens 21 of a biconvex lens, an aperture 22, and a sixth lens 23 of a biconvex lens. The third lens group 3 includes a seventh lens 31 and an eighth lens 32 having a mating face therebetween, a ninth lens 33 facing its concave surface toward the screen, and a tenth lens 34 of a biconvex lens.

In the first embodiment shown in FIG. 1, a resin is bonded on one surface of each of the sixth lens 23 of the second lens group 2 and the ninth lens 33 of the third lens group 3 (hereinafter, these lenses are referred to as hybrid lenses). While the resin-bonded surface of each of the hybrid lenses is spherical, the opposite surface thereof is aspherical. The first lens 11 of the first lens group 1 is made from plastic and the largest in diameter among the lenses in the projection lens apparatus 4. Using a plastic lens as the first lens 11 serves to reduce the weight of the projection lens apparatus 4. The plastic lens, however, has a problem such that the lens changes in shape according to changes in temperature and humidity, thereby causing deterioration of its lens characteristics. Controlling a power of the plastic lens is required to suppress the deterioration of the lens characteristics due to temperature and humidity. To minimize the deterioration of the lens characteristics, the present invention sets the following condition:

$$7 < |f_{L1}/f|$$

here, f: a focal length of the whole lens system; and $F_{L1}$: a focal length of the first lens 11 of the first lens group 1.

The plastic lens has generally poor accuracy in shape compared to a glass lens. To suppress the deterioration of the lens with poor accuracy in shape, a ray is made incident on the first lens 11 in a direction substantially perpendicular to the first lens 11 of the first lens group 1 in the projection lens apparatus 4 according to the present invention. This configuration allows the plastic lens to have a larger tolerance in shape and enhance its manufacturability. The plastic lens has aspherical surfaces, thereby serving to compensate distortion aberration.

The ninth lens 33 of the third lens group 3 is a hybrid lens having an aspherical surface. This serves to compensate off-axis aberration effectively because of a large off-axis ray height of the hybrid lens. The sixth lens 23 of the second lens group 2 arranged close to the aperture 22 is also a hybrid lens having an aspherical surface, thereby serving to compensate on-axis aberration effectively. With this configuration, a desired back focus is secured so that the TIR prism 5 is arranged between the projection lens apparatus 4 and the DMD element 6. Consequently, the projection lens apparatus 4 is allowed to compensate various kinds of aberration satisfactorily and realize performing a high-resolution projection, while achieving its miniaturization and wide-angle. In order to realize these states, it is required to meet the following conditions:

$$1.4 < |f_1|/f \quad (1)$$

$$2.8 < f_3/f \quad (2)$$

$$3.6 < f_b/f \quad (3)$$

$$0.1 < |f_1/f_{23}| 0.3 \quad (4)$$

here, f: a focal length of the whole lens system;

$f_b$: a back focus of the whole lens system;

$f_1$: a focal length of the first lens group;

$f_3$: a focal length of the third lens group; and $f_{23}$: a combined focal length of the second and third lens groups.

The conditions (1) and (2) are set to reduce chromatic aberration of magnification by controlling the powers of the first and third lens groups having a maximum off-ray height. It becomes difficult to compensate the chromatic aberration of magnification, when $|f_1|/f$ and $f_3/f$ become equal to or fall below the respectively corresponding lower limits.

The condition (3) is set to secure an appropriate back focus. The back focus becomes shorter, when $f_b/f$ becomes equal to or falls below its lower limit. In this case, there is insufficient space left between the projection lens apparatus and a liquid crystal display element or the DMD element in which an optical element is arranged.

The condition (4) is set to secure the appropriate back focus and reduce negative distortion aberration. When $|f_1/f_{23}|$ becomes equal to or exceeds its upper limit, the positive powers of the second and third lens groups become larger, thereby leading to difficulty in securing the appropriate back focus. When $|f_1/f_{23}|$ becomes equal to or falls below its lower limit, the negative power of the first lens group becomes larger, thereby leading to increase in negative distortion aberration.

Referring now to the attached tables, the embodiments of the present invention will be described in further detail. Table 1 corresponds to FIG. 1, which is a schematic view of the projection lens apparatus according to the first embodiment of the present invention. Similarly, Tables 2, 3, 4, and 5 correspond to FIGS. 5, 9, 13, and 17, respectively. In these tables, $R_i$ represents a radius of curvature of an ith surface counted from the screen including the surface of the aperture. $D_i$ represents a distance, on the optical axis, from the ith to (i+1)th surfaces counted from the screen. $N_j$ and $v_j$ represent a refractive index and an Abbe number (d line) of the jth lens counted from the screen.

When $R_i$, K, h, and A, B, C, D, etc., are given, a shape of an aspherical surface is specified in the following widely used equation:

$$Z = (1/R_i) \cdot h^2/[1 + \sqrt{\{1-(K+1)\cdot(1/R_i)^2 \cdot h^2\}}] + A \cdot h^4 + B \cdot h^6 + C \cdot h^8 + D \cdot h^{10} + \ldots$$

here, Z: an axis in the optical axis;

$R_i$: a radius of curvature of an ith surface on the optical axis;

K: a conical constant;

h: an axis in the radium direction of a lens; and

A, B, C, D, etc.: high order coefficients of the aspherical surface.

TABLE 1

| i | j | $R_i$ | $D_i$ | $N_i$ | $v_j$ |
|---|---|---|---|---|---|
| 1 | 1 | 56.822 | 5 | 1.499091 | 58.0 |
| 2 |   | 24.186 | 12.13 |   |   |
| 3 | 2 | 59.369 | 2 | 1.62041 | 60.3 |
| 4 |   | 21.691 | 12.58 |   |   |
| 5 | 3 | −32.19 | 2 | 1.74400 | 44.9 |
| 6 |   | 31.969 | 4.46 |   |   |
| 7 | 4 | 298.82 | 4.99 | 0.84666 | 23.8 |
| 8 |   | −50.963 | 0.52 |   |   |
| 9 | 5 | 31.151 | 7.49 | 1.65412 | 39.6 |
| 10 |   | −144.61 | 23.39 |   |   |
| 11 |   | 8 | 7.6 |   |   |
| 12 | 6 | −526.002 | 0.1 | 1.520200 | 52.0 |
| 13 | 7 | 5513.648 | 4.84 | 1.49700 | 81.6 |
| 14 |   | −12.03 | 0.5 |   |   |
| 15 | 8 | −12.099 | 2 | 1.75520 | 27.5 |
| 16 | 9 | 25.096 | 6.93 | 1.49700 | 81.6 |
| 17 |   | −24.778 | 0.51 |   |   |
| 18 | 10 | −85.7 | 5.52 | 1.49700 | 81.6 |
| 19 | 11 | −23.628 | 0.1 | 1.520200 | 52.0 |
| 20 |   | −26.797 | 0.5 |   |   |
| 21 | 12 | 186 | 6.04 | 1.84666 | 23.8 |
| 22 |   | −39.674 | 5 |   |   |
| 23 | 13 | 8 | 27 | 1.51680 | 64.2 |
| 24 |   | 8 | 4.5 |   |   |
| 25 | 14 | 8 | 2.75 | 1.47200 | 55 |
| 26 |   | 8 | 1.55 |   |   |

Aspherical Surface:
1st surface K: 2.068172, A: −9.034348e-7,
B: 2.140360e-9, C: −1.175769e-12,
D: 2.708077e-16

2nd surface K: −1.161402, A: −4.055402e-7,
  B: −5.42700e-10, C: 8.850174e-12,
  D: −1.234473e-14
12th surface K: −6729.736862, A: −4.477155e-5,
  B: −1.779039e-7, C: 1.971636e-9,
  D: −1.147868e-11
20th surface K: 1.456989, A: 4.909620E-6,
  B: 2.770520e-9, C: 2.103590e-11,
  D: 3.609500e-14
F-number: FNO=2.75 half field angle: ω=43.9°
  f: 11.28, $f_b$: 40.8, $f_1$: −17.1, $f_3$: 48.7, $f_{23}$: 81.5

$|f_1|/f = 1.52$ $f_3/f = 4.3$ $f_b/f = 3.62$ $|f_1/f_{23}| = 0.21$ $|f_{L1}/f| = 7.98$

Figure 2:
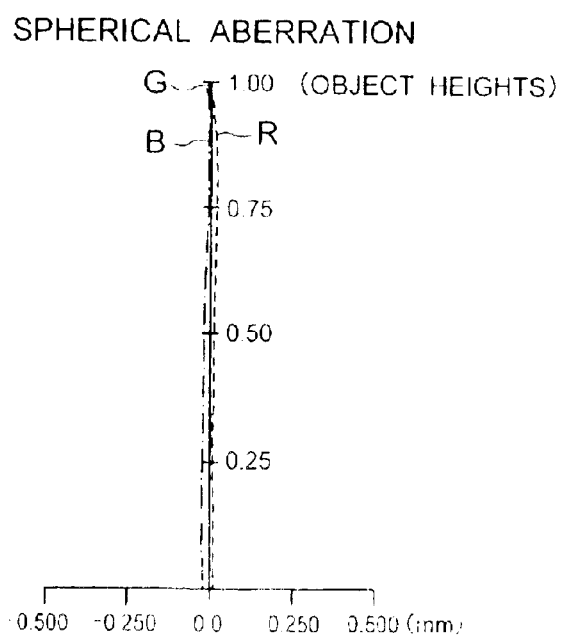
FIG. 2 is an illustration of spherical aberration of the projection lens apparatus according to the first embodiment.
Figure 3:
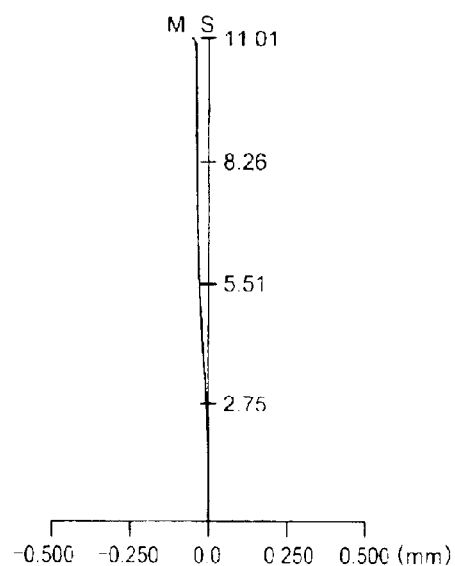
FIG. 3 is an illustration of astigmatism of the projection lens apparatus according to the first embodiment.
Figure 4:
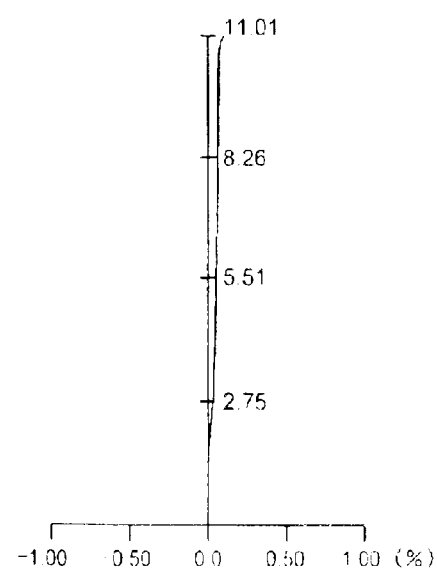
FIG. 4 is an illustration of distortion aberration of the projection lens apparatus according to the first embodiment.
Figure 5:
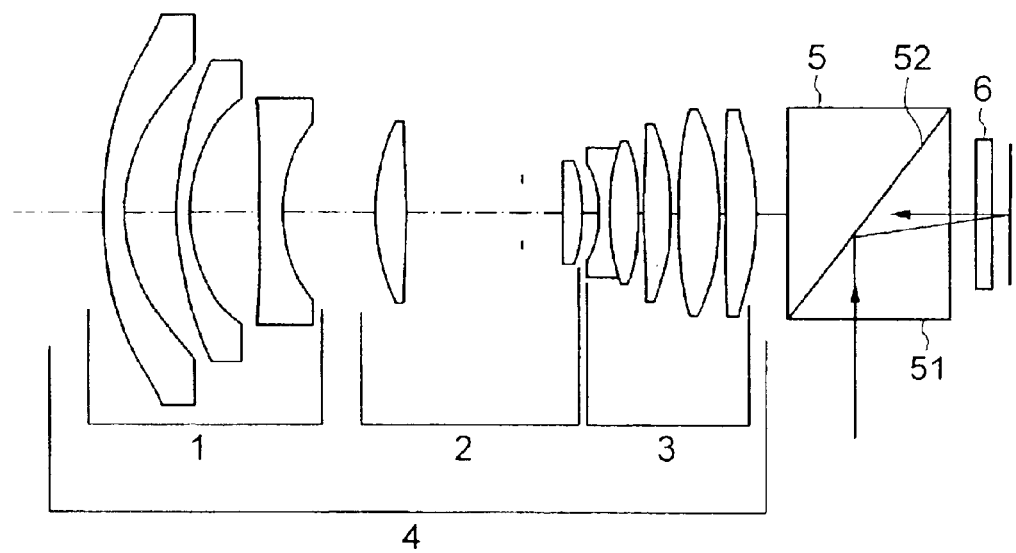
FIG. 5 is a schematic view of a projection lens apparatus according to a second embodiment of the present invention.

Spherical aberration, astigmatism, and distortion aberration related to Table 1 are shown in FIGS. 2, 3, and 4, respectively. In these figures, G, R, and B indicate aberration of the wavelengths of rays of 555 nm, 650 nm, and 450 nm, respectively. S and M indicate, respectively, a sagittal image surface and a meridional image surface of a wavelength of a ray of 555 nm. FIGS. 2 to 4 apparently indicate that the aberration shown in the above figures are satisfactorily compensated, accordingly realizing lens characteristics of the projection lens apparatus necessary for high image quality. Although a DMD element is employed as an image display element in the above-described embodiment, a liquid crystal display element or a display element, which transmits and reflects rays for forming an image by using electrical signals, may be employed instead of the DMD element.

TABLE 2

| i | j | $R_i$ | $D_i$ | $N_i$ | $v_j$ |
|---|---|---|---|---|---|
| 1 | 1 | 100 | 3.3 | 1.490901 | 58.0 |
| 2 |   | 27.973 | 8.72 |   |   |
| 3 | 2 | 53.502 | 2 | 1.62041 | 60.3 |
| 4 |   | 24.705 | 11.81 |   |   |
| 5 | 3 | 411049.782 | 4 | 1.49091 | 58.0 |
| 6 |   | 22.355 | 15.77 |   |   |
| 7 | 4 | 36.502 | 4.67 | 1.84666 | 23.8 |
| 8 |   | −5528.298 | 19.79 |   |   |
| 9 |   | 8 | 6.8 |   |   |
| 10 | 5 | −2031.293 | 3.01 | 1.48749 | 70.4 |
| 11 |   | −27.791 | 2.765 |   |   |
| 12 | 6 | −18.102 | 2 | 1.80518 | 25.5 |
| 13 | 7 | 36.397 | 5 | 1.48749 | 70.4 |
| 14 |   | −40.088 | 1 |   |   |
| 15 | 8 | 352.742 | 4.48 | 1.48749 | 70.4 |
| 16 |   | −38.889 | 1 |   |   |
| 17 | 9 | 71.023 | 7.04 | 1.58144 | 40.9 |
| 18 |   | −39.912 | 1 |   |   |
| 19 | 10 | 425.704 | 5.06 | 1.49091 | 58.0 |
| 20 |   | −43.288 | 5 |   |   |
| 21 | 11 | 8 | 27 | 1.51680 | 64.2 |
| 22 |   | 8 | 4.5 |   |   |
| 23 | 12 | 8 | 2.75 | 1.47200 | 55.0 |
| 24 |   | 8 | 1.55 |   |   |

Aspherical Surface:
1st surface K: 0, A: 1.303107Ee-3, B: 1.54150e-6,
  C: 1.185250e-9, D: −5.127177e-13
2nd surface K:0, A:5.820000e-4, B: 2.944327e-7,
  C: −4.041408e-9, D: −3.178235e-13
5th surface K: −683119333.312, A: 7.560320e-4,
  B: −9.918486e-6, C: 4.248327e-8,
  D: −7.666378e-11
6th surface K: −1.907139, A: 1.750551e-3,
  B: −2.284930e-5, C: 1.382748e-7,
  D: −2.934505e-10
19th surface K: 0, A: −5.439591e-4, B: −3.067743e-6,
  C: 1.206313e-8, D: 6.496498e-12
20th surface K: 0, A: 3.892849e-4, B: −3.091477e-6,
  C: 1.131288e-8, D: 1.049618e-11
F-number: FNO=2.75 half field angle: ω=43.9°
  f: 11.23, $f_b$: 40.8, $f_1$: −16.6, $f_3$: 33.3, $f_{23}$: 59.1

$|f_1|/f = 1.48$ $f_3/f = 2.97$ $f_b/f = 3.62$ $|f_1/f_{23}| = 0.288$ $|f_{L1}/f| = 7.12$

Figure 6:
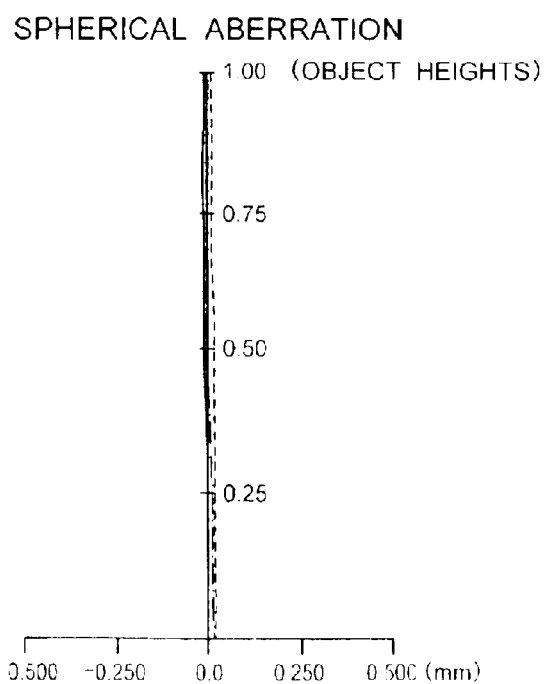
FIG. 6 is an illustration of spherical aberration of the projection lens apparatus according to the second embodiment.
Figure 7:
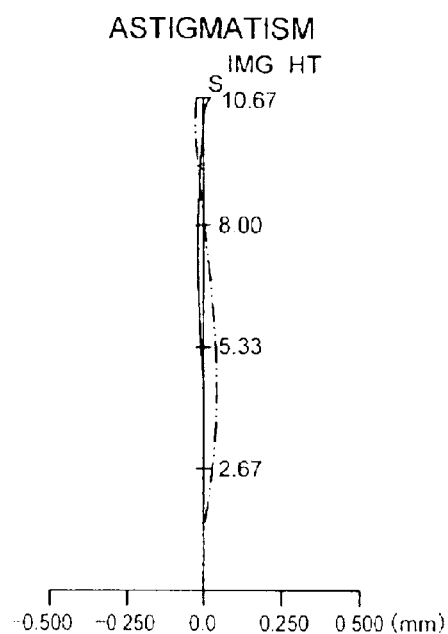
FIG. 7 is an illustration of astigmatism of the projection lens apparatus according to the second embodiment.
Figure 8:
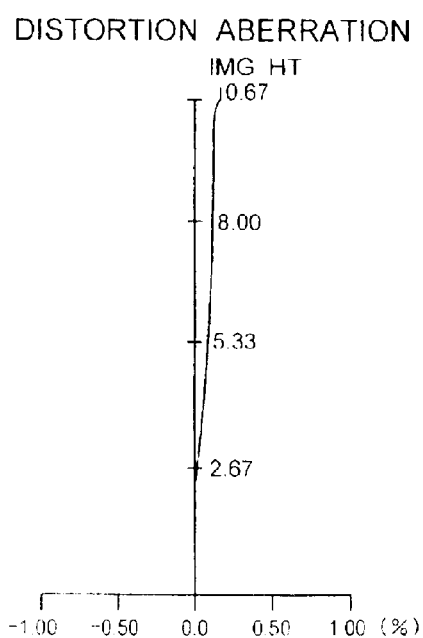
FIG. 8 is an illustration of distortion aberration of the projection lens apparatus according to the second embodiment.
Figure 9:
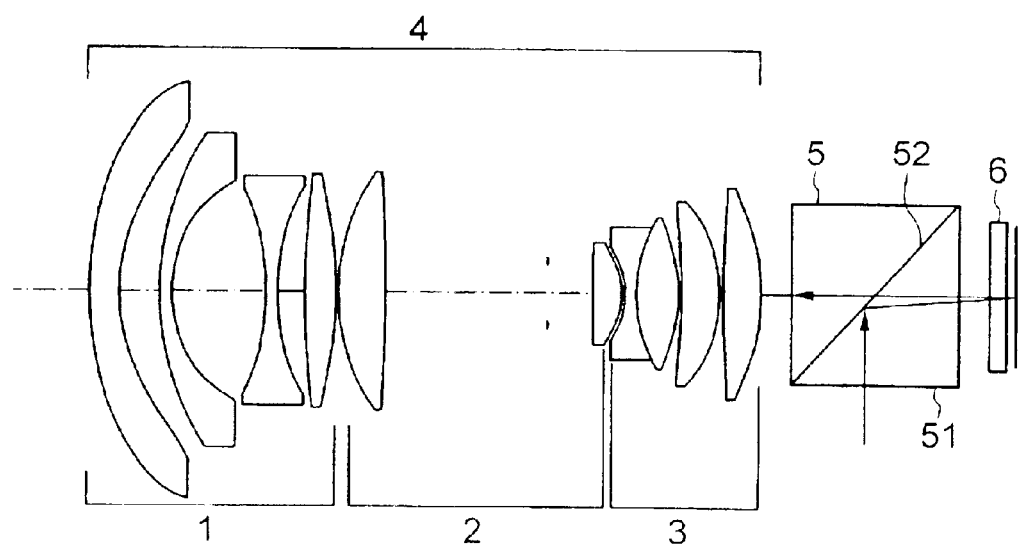
FIG. 9 is a schematic view of a projection lens apparatus according to a third embodiment of the present invention.

Spherical aberration, astigmatism, and distortion aberration related to Table 2 are shown in FIGS. 6, 7, and 8, respectively. In these figures, G, R, and B indicate aberration of the wavelengths of rays of 555 nm, 650 nm, and 450 nm, respectively. S and M indicate, respectively, a sagittal image surface and a meridional image surface of a wavelength of a ray of 555 nm.

FIGS. 6 to 8 apparently indicate that the aberration shown in the above figures are satisfactorily compensated, accordingly realizing lens characteristics of the projection lens apparatus necessary for high image quality.

TABLE 3

| i | j | $R_i$ | $D_i$ | $N_i$ | $v_j$ |
|---|---|---|---|---|---|
| 1 | 1 | 60.605 | 5 | 1.499091 | 58.0 |
| 2 |   | 24.903 | 6.5 |   |   |
| 3 | 2 | 43.695 | 2 | 1.62041 | 60.3 |
| 4 |   | 19.327 | 15.35 |   |   |
| 5 | 3 | −36.121 | 2 | 1.74400 | 44.9 |
| 6 |   | 31.698 | 4.52 |   |   |
| 7 | 4 | 135.746 | 5.1 | 0.84666 | 23.8 |
| 8 |   | −64.108 | 0.5 |   |   |
| 9 | 5 | 31.252 | 7.97 | 1.65412 | 39.6 |
| 10 |   | −194.4 | 26.06 |   |   |
| 11 |   | 8 | 7 |   |   |
| 12 | 6 | −273.905 | 0.1 | 1.520200 | 52.0 |
| 13 | 7 | −280.909 | 4.66 | 1.49700 | 81.6 |
| 14 |   | −12.338 | 0.5 |   |   |
| 15 | 8 | −12.754 | 2 | 1.75520 | 27.5 |
| 16 | 9 | 23.486 | 6.87 | 1.49700 | 81.6 |
| 17 |   | −25.81 | 0.5 |   |   |
| 18 | 10 | −78.468 | 6.04 | 1.49700 | 81.6 |
| 19 | 11 | −21.737 | 0.1 | 1.520200 | 52.0 |
| 20 |   | −24.296 | 0.5 |   |   |
| 21 | 12 | 470.507 | 5.93 | 1.84666 | 23.8 |
| 22 |   | −36.23 | 5 |   |   |
| 23 | 13 | 8 | 27 | 1.51680 | 64.2 |
| 24 |   | 8 | 4.5 |   |   |
| 25 | 14 | 8 | 2.75 | 1.47200 | 55 |
| 26 |   | 8 | 1.55 |   |   |

Aspherical Surface:
1st surface K: 2.429735, A: 1.883753e-6,
  B: −3.060454e-9, C: 2.691520e-12,
  D: −1.704096e-15

2nd surface K: −1.097959, A: −5.144892e-7,
  B: −8.354796e-9, C: −3.030524e-12,
  D: 8.085546e-15
12th surface K: −6006.527896, A: −9.250468e-5,
  B: 5.790455e-7, C: −1.088606e-8,
  D: 6.718634e-11
20th surface K: 1.170151, A: 5.679944E-6,
  B: 8.160707e-9, C: 8.28354e-12,
  D: 1.159747e-13
F-number: FNO=2.75 half field angle: ω=43.9°
  f: 11.25, $f_b$: 40.8, $f_1$: −18.1, $f_3$: 43.68, $f_{23}$: 93.15

$|f_1|/f=1.61$ $f_3/f=3.88$ $f_b/f=3.62$ $|f_1/f_{23}|=0.19$ $|f_{L1}/f|=8$

Figure 10:
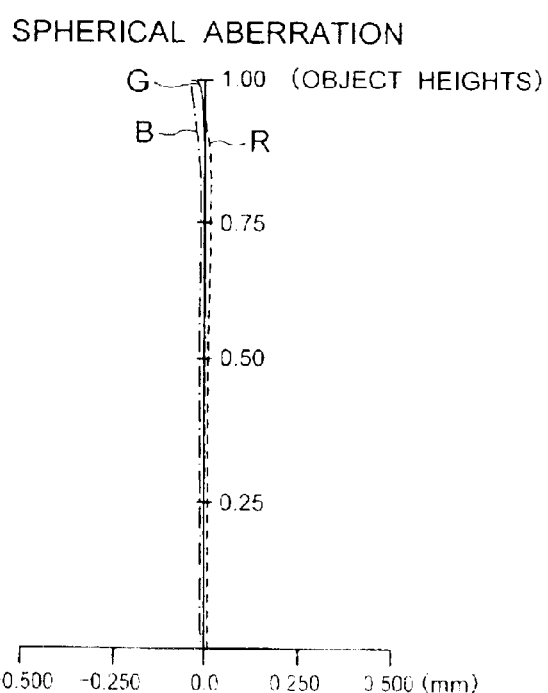
FIG. 10 is an illustration of spherical aberration of the projection lens apparatus according to the third embodiment.
Figure 11:
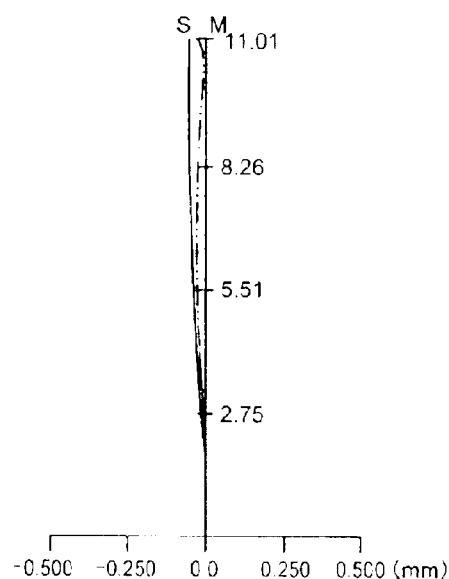
FIG. 11 is an illustration of astigmatism of the projection lens apparatus according to the third embodiment.
Figure 12:
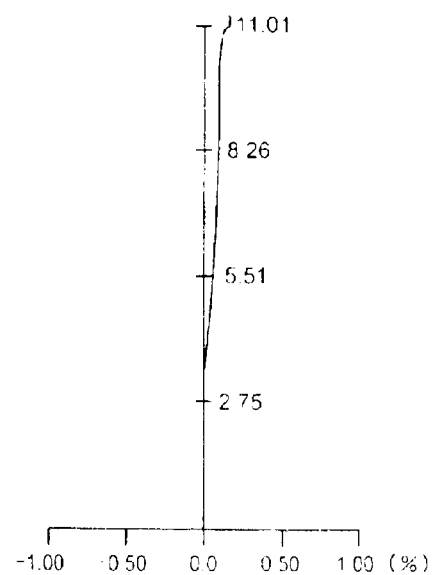
FIG. 12 is an illustration of distortion aberration of the projection lens apparatus according to the third embodiment.
Figure 13:
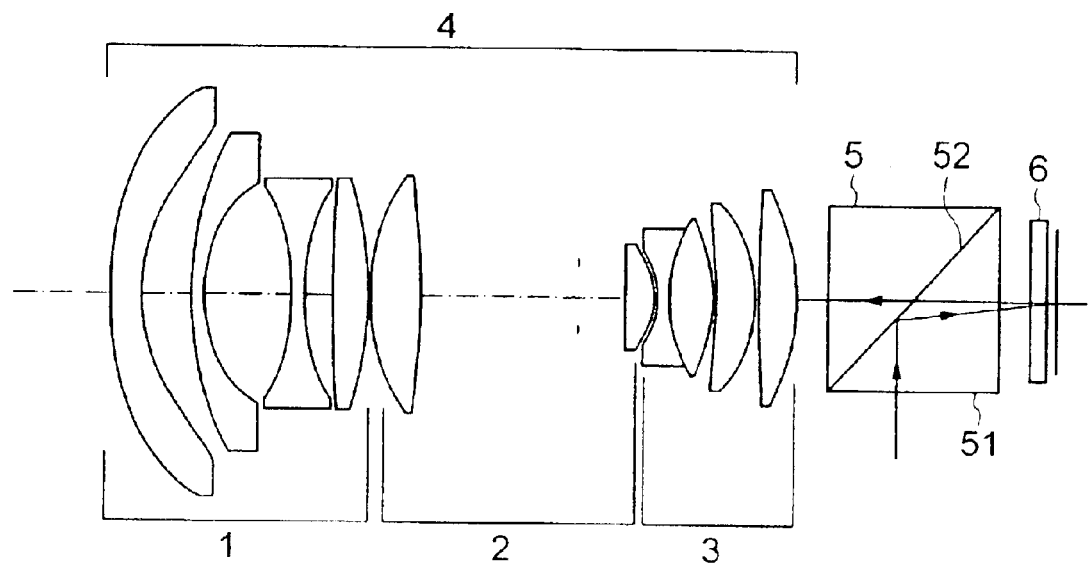
FIG. 13 is a schematic view of a projection lens apparatus according to a fourth embodiment of the present invention.

Spherical aberration, astigmatism, and distortion aberration based on Table 3 are shown in FIGS. 10, 11, and 12, respectively. In these figures, G, R, and B indicate aberration of the wavelengths of rays of 555 nm, 650 nm, and 450 nm, respectively. S and M indicate, respectively, a sagittal image surface and a meridional image surface of a wavelength of a ray of 555 nm. FIGS. 10 to 12 apparently indicate that the aberration shown in the above figures are satisfactorily compensated, accordingly realizing lens characteristics of the projection lens apparatus necessary for high image quality.

TABLE 4

| i | j | $R_i$ | $D_i$ | $N_i$ | $v_j$ |
|---|---|---|---|---|---|
| 1 | 1 | 55.203 | 5 | 1.499091 | 58.0 |
| 2 |   | 23.856 | 67.977 |   |   |
| 3 | 2 | 51.569 | 2 | 1.62041 | 60.3 |
| 4 |   | 20.953 | 14.07 |   |   |
| 5 | 3 | −33.488 | 2 | 1.74400 | 44.9 |
| 6 |   | 31.698 | 4.65 |   |   |
| 7 | 4 | 242.91 | 5.5 | 0.84666 | 23.8 |
| 8 |   | −56.232 | 0.52 |   |   |
| 9 | 5 | 32.267 | 7.9 | 1.65412 | 39.6 |
| 10 |   | −135.746 | 24.87 |   |   |
| 11 |   | 8 | 7.5 |   |   |
| 12 | 6 | −1072.605 | 0.1 | 1.520200 | 52.0 |
| 13 | 7 | 5513.648 | 4.69 | 1.49700 | 81.6 |
| 14 |   | −12.467 | 0.5 |   |   |
| 15 | 8 | −12.562 | 2 | 1.75520 | 27.5 |
| 16 | 9 | 24.265 | 7.07 | 1.49700 | 81.6 |
| 17 |   | −24.809 | 0.5 |   |   |
| 18 | 10 | −75.256 | 5.66 | 1.49700 | 81.6 |
| 19 | 11 | −22.694 | 0.1 | 1.520200 | 52.0 |
| 20 |   | −25.996 | 0.5 |   |   |
| 21 | 12 | 370.391 | 6.07 | 1.84666 | 23.8 |
| 22 |   | −36.397 | 5 |   |   |
| 23 | 13 | 8 | 27 | 1.51680 | 64.2 |
| 24 |   | 8 | 4.5 |   |   |
| 25 | 14 | 8 | 2.75 | 1.47200 | 55 |
| 26 |   | 8 | 1.55 |   |   |

Aspherical Surface:
1st surface K: 2.068171, A: 3.704251e-7,
  B: −1.773038e-9, C: 2.586699e-12,
  D: −1.350369e-15
2nd surface K: −1.080023, A: −3.950647e-7,
  B: −1.071853e-8, C: 1.462552e-11,
  D: −1.035022e-14
12th surface K: −6729.726862, A: −4.546386e-5,
  B: −1.908974e-7, C: 2.662512e-9,
  D: −2.171104e-11
20th surface K: 1.349085, A: 6.028083E-6,
  B: 5.573375e-9, C: 1.681841e-11,
  D: 5.542812e-14
F-number: FNO=2.75 half field angle: ω=43.9°
  f: 11.2578, $f_b$: 40.8, $f_1$: −17.42, $f_3$: 46.14, $f_{23}$: 90.02

$|f_1|/f=1.55$ $f_3/f=4.10$ $f_b/f=3.62$ $|f_1/f_{23}|=0.12$ $|f_{L1}/f|=7.99$

Figure 14:
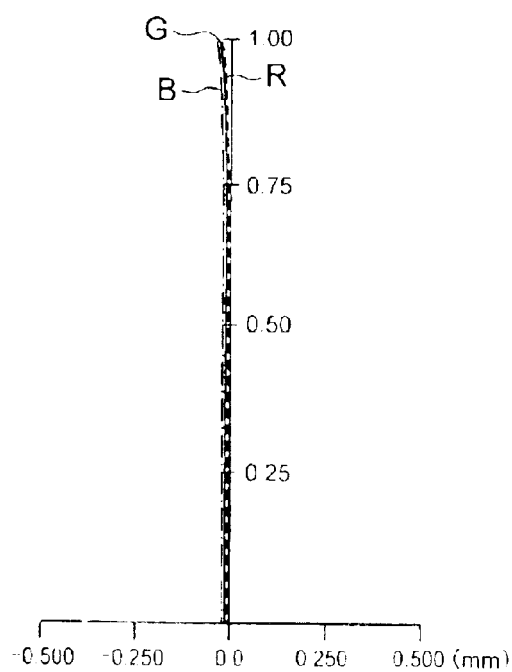
FIG. 14 is an illustration of spherical aberration of the projection lens apparatus according to the fourth embodiment.
Figure 15:
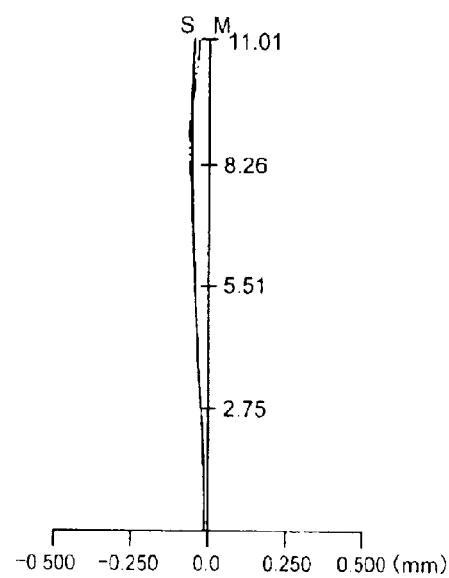
FIG. 15 is an illustration of astigmatism of the projection lens apparatus according to the fourth embodiment.
Figure 16:
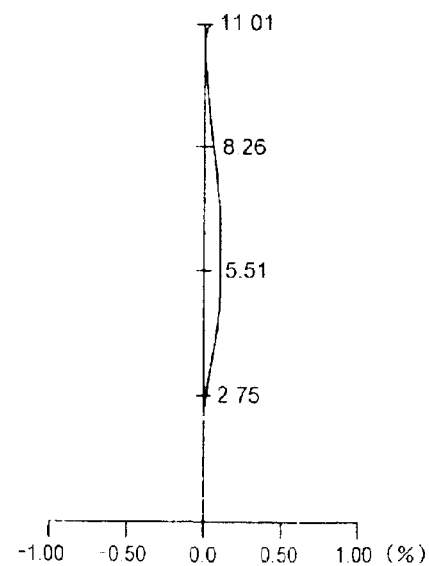
FIG. 16 is an illustration of distortion aberration of the projection lens apparatus according to the fourth embodiment.
Figure 17:
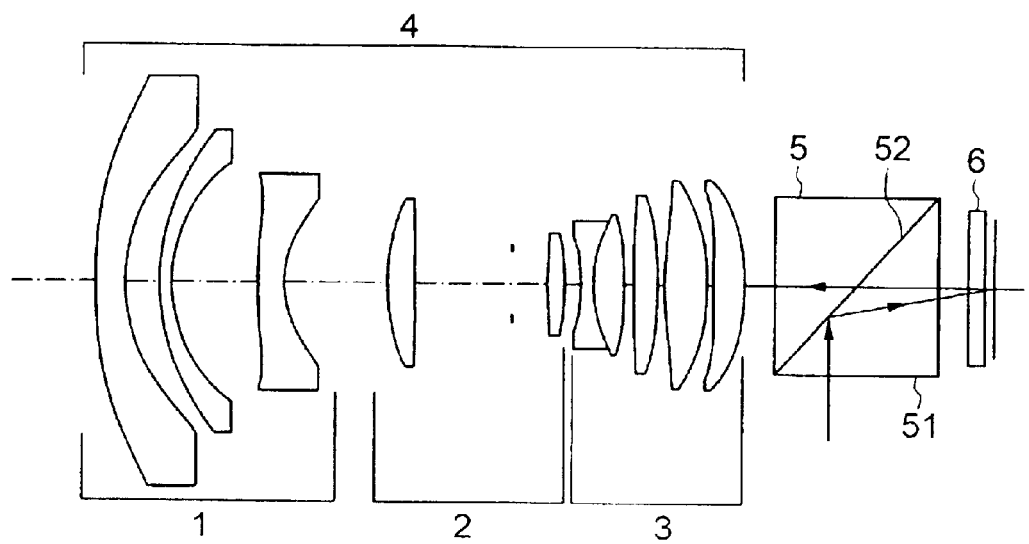
FIG. 17 is a schematic view of a projection lens apparatus according to a fifth embodiment of the present invention.

Spherical aberration, astigmatism, and distortion aberration based on Table 4 are shown in FIGS. 14, 15, and 16, respectively. In these figures, G, R, and B indicate aberration of the wavelengths of rays of 555 nm, 650 nm, and 450 nm, respectively. S and M indicate, respectively, a sagittal image surface and a meridional image surface of a wavelength of a ray of 555 nm. FIGS. 14 to 16 apparently indicate that the aberration shown in the above figures are satisfactorily compensated, accordingly realizing lens characteristics of the projection lens apparatus necessary for high image quality.

TABLE 5

| i | j | $R_i$ | $D_i$ | $N_i$ | $v_j$ |
|---|---|---|---|---|---|
| 1 | 1 | 99.901 | 5 | 1.490901 | 58.0 |
| 2 |   | 27.806 | 5.99 |   |   |
| 3 | 2 | 36.686 | 2 | 1.62041 | 60.3 |
| 4 |   | 23.142 | 14.769 |   |   |
| 5 | 3 | 147.145 | 4.2 | 1.49091 | 58.0 |
| 6 |   | 15.898 | 17.55 |   |   |
| 7 | 4 | 37.324 | 4.504 | 1.84666 | 23.8 |
| 8 |   | −338.388 | 16.5 |   |   |
| 9 |   | 8 | 6.022 |   |   |
| 10 | 5 | 148.210 | 2.88 | 1.48749 | 70.4 |
| 11 |   | −35.173 | 2.733 |   |   |
| 12 | 6 | −20.098 | 2 | 1.80518 | 25.5 |
| 13 | 7 | 23.125 | 5.217 | 1.48749 | 70.4 |
| 14 |   | −38.451 | 1.550 |   |   |
| 15 | 8 | 581.969 | 4.085 | 1.48749 | 70.4 |
| 16 |   | −44.686 | 1 |   |   |
| 17 | 9 | 115.239 | 7.073 | 1.58144 | 40.9 |
| 18 |   | −30.898 | 1 |   |   |
| 19 | 10 | −1723.784 | 5.117 | 1.49091 | 58.0 |
| 20 |   | −38.589 | 5 |   |   |
| 21 | 11 | 8 | 27 | 1.51680 | 64.2 |
| 22 |   | 8 | 4.5 |   |   |
| 23 | 12 | 8 | 2.75 | 1.47200 | 55.0 |
| 24 |   | 8 | 1.55 |   |   |

Aspherical Surface:
1st surface K: −26.973907, A: 1.268671Ee-5,
  B: −1.401240e-8, C: 9.599903e-12,
  D: −3.473665e-15
2nd surface K: −0.043044, A: 6.080164e-5,
  B: 1.133503e-9, C: −3.810279e-11,
  D: 7.928239e-17
5th surface K: −106.491112, A: 4.681539e-6,
  B: −1.235157e-7, C: 4.670941 e-10,
  D: −7.569594e-13
6th surface K: −719376, A: 4.522386e-6,
  B: −2.621143e-7, C: 1.498970e-9,
  D: −3.115547e-12

19th surface K: 8181.539060, A: −1.735505e-5,
B: −3.594589e-8, C: 3.445454e-12,
D: −7.173390e-14
20th surface K: 1.780692, A: −5.749135e-6,
B: −3.207989e-8, C: 3.733309e-11,
D: −9.642571 e-14
F-number: FNO=2.75 half field angle: ω=43.9°
f: 11.257, $f_b$: 40.8, $f_1$: −15.94, $f_3$: 32.6, $f_{23}$: 53.95

$|f_1|/f=1.42$ $f_3/f=2.89$ $f_b/f=3.62$ $|f_1/f_{23}|=0.295$ $|f_{L1}/f|=7.10$

Figure 18:
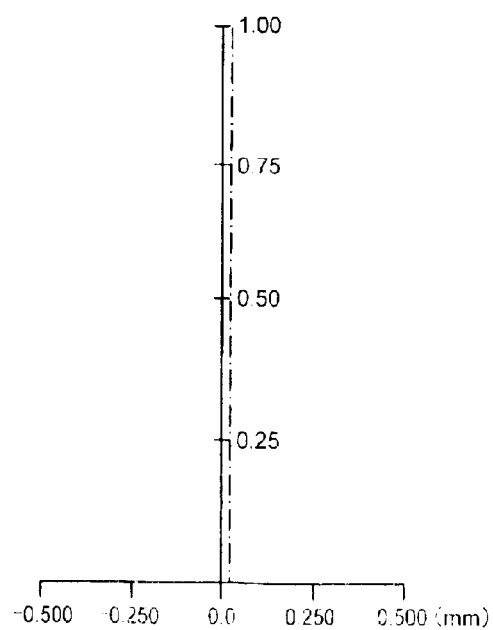
FIG. 18 is an illustration of spherical aberration of the projection lens apparatus according to the fifth embodiment.
Figure 19:
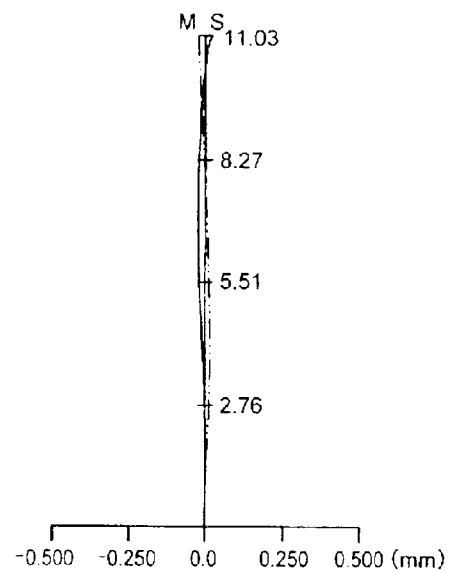
FIG. 19 is an illustration of astigmatism of the projection lens apparatus according to the fifth embodiment.
Figure 20:
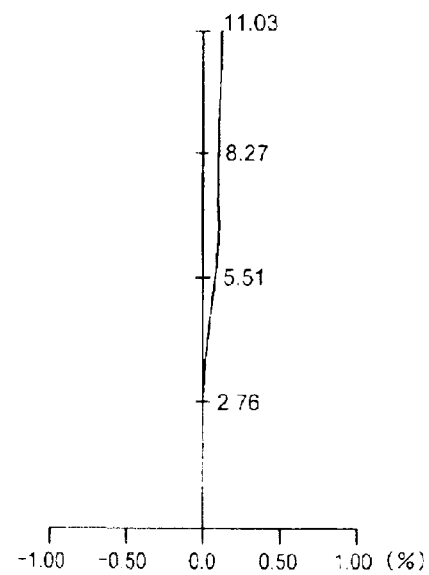
FIG. 20 is an illustration of distortion aberration of the projection lens apparatus according to the fifth embodiment.

Spherical aberration, astigmatism, and distortion aberration based on Table 5 are shown in FIGS. 18, 19, and 20, respectively. In these figures, G, R, and B indicate aberration of the wavelengths of rays of 555 nm, 650 nm, and 450 nm, respectively. S and M indicate, respectively, a sagittal image surface and a meridional image surface of a wavelength of a ray of 555 nm. FIGS. 18 to 20 apparently indicate that the aberration shown in the above figures are satisfactorily compensated, accordingly realizing lens characteristics of the projection lens apparatus necessary for high image quality.

Figure 21:
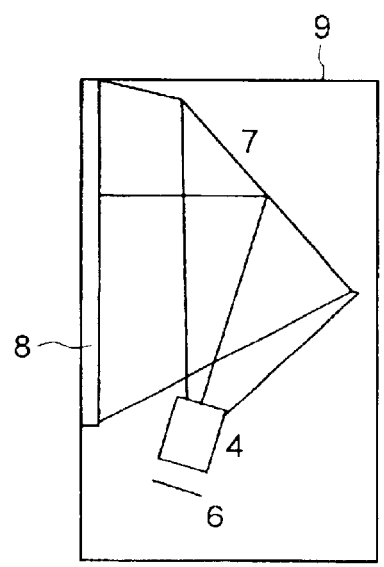
FIG. 21 is a schematic view of a projection type image display apparatus in which there is incorporated the projection lens apparatus according to any one of the above embodiments.

FIG. 21 is a schematic view of a projection type image display apparatus equipped with the projection lens apparatus according to any of the embodiments of the present invention. A light emitted from a light source is made incident on the DMD element 6, and then a light reflected thereat is made incident on the projection lens apparatus 4. The incident light is emitted at the projection lens apparatus 4, and reflected at a mirror 7. Thus, an overhead projection of an image formed at the DMD element 6 is performed on the projection screen 8. The mirror 7 is intended to bend the light path of the light emitted at the projection lens apparatus 4 so as to reduce the size of the projection type image display apparatus 9. Additionally, the miniaturization and wide-angle of the projection lens apparatus 4 serves to reduce the size of the projection type image display apparatus 9.

Decentering the optical axis of the projection lens apparatus 4 against the center of the screen 8 allows each component in the projection type image display apparatus 9 to be arranged in an optimal manner, thereby achieving further miniaturization of the projection type image display apparatus 9. In addition, this decentration accompanies making the center of a Fresnel screen to be decentered.

Figure 22:
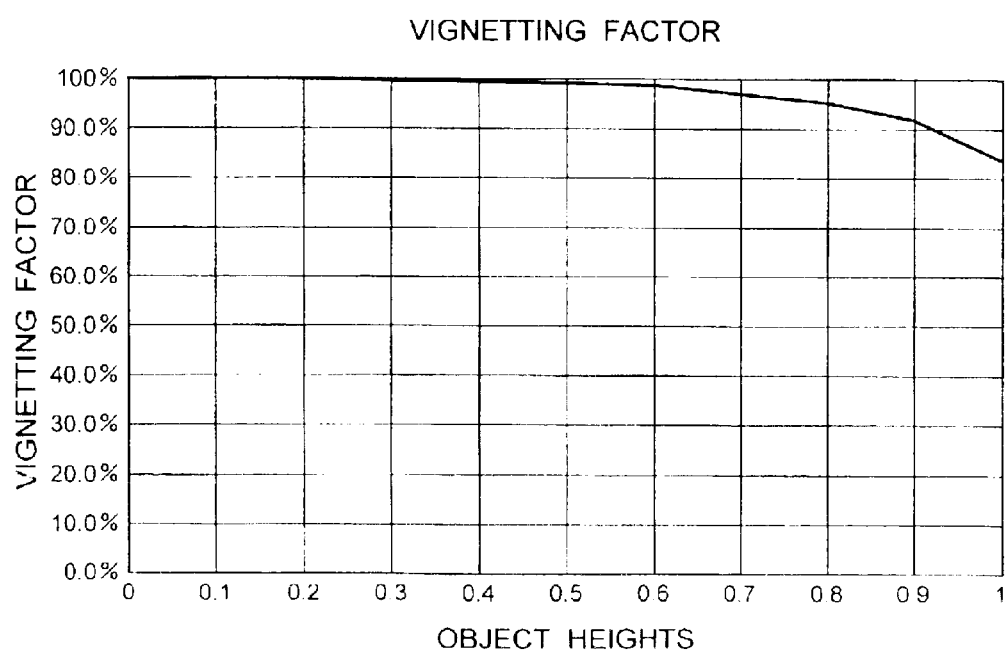
FIG. 22 is an illustration of a vignetting factor of the projection lens apparatus according to any one of the above embodiments.

FIG. 22 shows vignetting factor vs. distance from the center of the projection screen. FIG. 22 indicates that, since the projection lens apparatus 4 has a high vignetting factor, the projection lens apparatus 4 used for the projection type image display apparatus 9 serves to form a bright image, favorably comparable with the one on the center of the screen, even on the periphery of the screen. Decentering the optical axis of the projection lens apparatus 4 against the center of the screen 8 as described above generally causes the projection lens apparatus 4 to have a vignetting factor different from the one, respectively, at the upper and lower parts of the screen, because of different object heights from the optical axis of the projection lens apparatus 4. This leads to different ratios of peripheral light quantities at the upper and lower parts of the screen, consequently ending up luminance unevenness on the screen. On the other hand, the projection lens apparatus according to any of the embodiments of the present invention has object heights of 0.9 and 1.0, respectively, at the upper and lower parts of the screen and this difference is about 8%. The small difference in these two object heights serves to have substantially equal ratios of peripheral light quantities on the whole screen, thus to obtain uniform brightness on the screen without luminance unevenness on the upper and lower parts of the screen.

As apparent from the drawings illustrating the lens characteristics, the projection lens apparatus according to the present invention satisfactorily compensates various kinds of aberration, while the compactness and the back focus of the projection lens apparatus are achieved. That is, the projection type image display apparatus equipped with the projection lens apparatus according to the present invention offers an image with high resolution, which is uniformly bright even on the periphery of the screen.

What is claimed is:

1. A projection type image display apparatus comprising:
    an image display element outputting an image ray;
    a projection lens apparatus for performing overhead projection of the image ray from said image display element, said projection lens apparatus having a plurality of lens elements;
    a reflection mirror reflecting the image ray from said projection lens apparatus; and
    a screen on which the image ray reflected by said reflection mirror is projected;
    wherein an optical axis of said projection lens apparatus is decentered from a center of said screen.

2. A projection type image display apparatus according to claim 1, wherein said image display element is a micro mirror display element provided with a plurality of micro mirrors.

3. A projection type image display apparatus according to claim 1, wherein said image display element is a liquid crystal display element.

4. A projection type image display apparatus according to claim 3, wherein the optical axis of said projection lens apparatus is decentered on the center of said screen.

5. A projection type image display apparatus according to claim 1, wherein said screen includes a Fresnel screen, and a center of the Fresnel screen is decentered from the center of said screen.

6. A projection type image display apparatus comprising:
    an image display element outputting an image ray;
    a projection lens apparatus for performing overhead projection of the image ray from said image display element, said projection lens apparatus having a plurality of lens elements;
    a reflection mirror reflecting the image ray from said projection lens apparatus; and
    a screen including a Fresnel screen and on which the image ray reflected by said reflection mirror is projected;
    wherein an optical axis of said projection lens apparatus is decentered upward from a center of said screen, and a center of said Fresnel screen is decentered from the center of said screen.

7. A projection type image display apparatus comprising:
    an image display element outputting an image ray;
    a projection lens apparatus for performing overhead projection of the image ray from said image display element, said projection lens apparatus having a plurality of lens elements;
    a reflection mirror reflecting the image ray from said projection lens apparatus; and a screen on which the image ray reflected by said reflection mirror is projected;

wherein the image ray on an optical axis of said projection lens apparatus reflected by said reflection mirror is projected upward from a center of said screen.

8. A projection type image display apparatus according to claim 7, wherein said image display element is a micro mirror display element provided with a plurality of micro mirrors.

9. A projection type image display apparatus according to claim 7, wherein said image display element is a liquid crystal display element.

10. A projection type image display apparatus according to claim 7, wherein said screen includes a Fresnel screen, and a center of the Fresnel screen is decentered from the center of said screen.

* * * * *